US 6,564,560 B2

(12) United States Patent
Butterworth et al.

(10) Patent No.: US 6,564,560 B2
(45) Date of Patent: May 20, 2003

(54) OIL-FREE LIQUID CHILLER

(75) Inventors: Arthur L. Butterworth, La Crosse, WI (US); Todd R. Vandeleest, West Salem, WI (US); David H. Eber, La Crosse, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/903,168

(22) Filed: Jul. 11, 2001

(65) Prior Publication Data
US 2001/0037651 A1 Nov. 8, 2001

Related U.S. Application Data

(62) Division of application No. 09/169,343, filed on Oct. 9, 1998, now Pat. No. 6,176,092, and a division of application No. 09/578,622, filed on May 25, 2000, now Pat. No. 6,279,340.

(51) Int. Cl.$^7$ ............................. F25B 31/00; F25B 43/02
(52) U.S. Cl. ............................. 62/84; 62/259.2; 62/505; 62/DIG. 2
(58) Field of Search .................. 62/DIG. 2, 505, 62/259.2, 84, 228.4

(56) References Cited

U.S. PATENT DOCUMENTS

| 3,057,172 A | * | 10/1962 | Ditzler | 62/505 |
| 3,499,297 A | * | 3/1970 | Ruff et al. | 62/228.4 X |
| 5,355,691 A | * | 10/1994 | Sullivan et al. | 62/228.4 X |
| 6,032,472 A | * | 3/2000 | Heinrichs et al. | 62/199 |

FOREIGN PATENT DOCUMENTS

JP 405203235 * 8/1993 ............. 62/259.2

* cited by examiner

Primary Examiner—William Wayner
(74) Attorney, Agent, or Firm—William J. Beres; William O'Driscoll

(57) ABSTRACT

A refrigeration chiller employs a centrifugal compressor the impellers of which are mounted on a shaft which is itself mounted for rotation using rolling element bearings lubricated only by the refrigerant which constitutes the working fluid of the chiller system. Apparatus is taught for providing liquid refrigerant to (1.) the bearings immediately upon chiller start-up, during chiller operation and during a coast-down period subsequent to shutdown of the chiller and (2.) the drive motor of the chiller's compressor for motor cooling purposes. By use of a variable speed-driven motor to drive the compressor, optimized part load chiller performance is achieved in a chiller which does not require or employ an oil-based lubrication system.

51 Claims, 6 Drawing Sheets

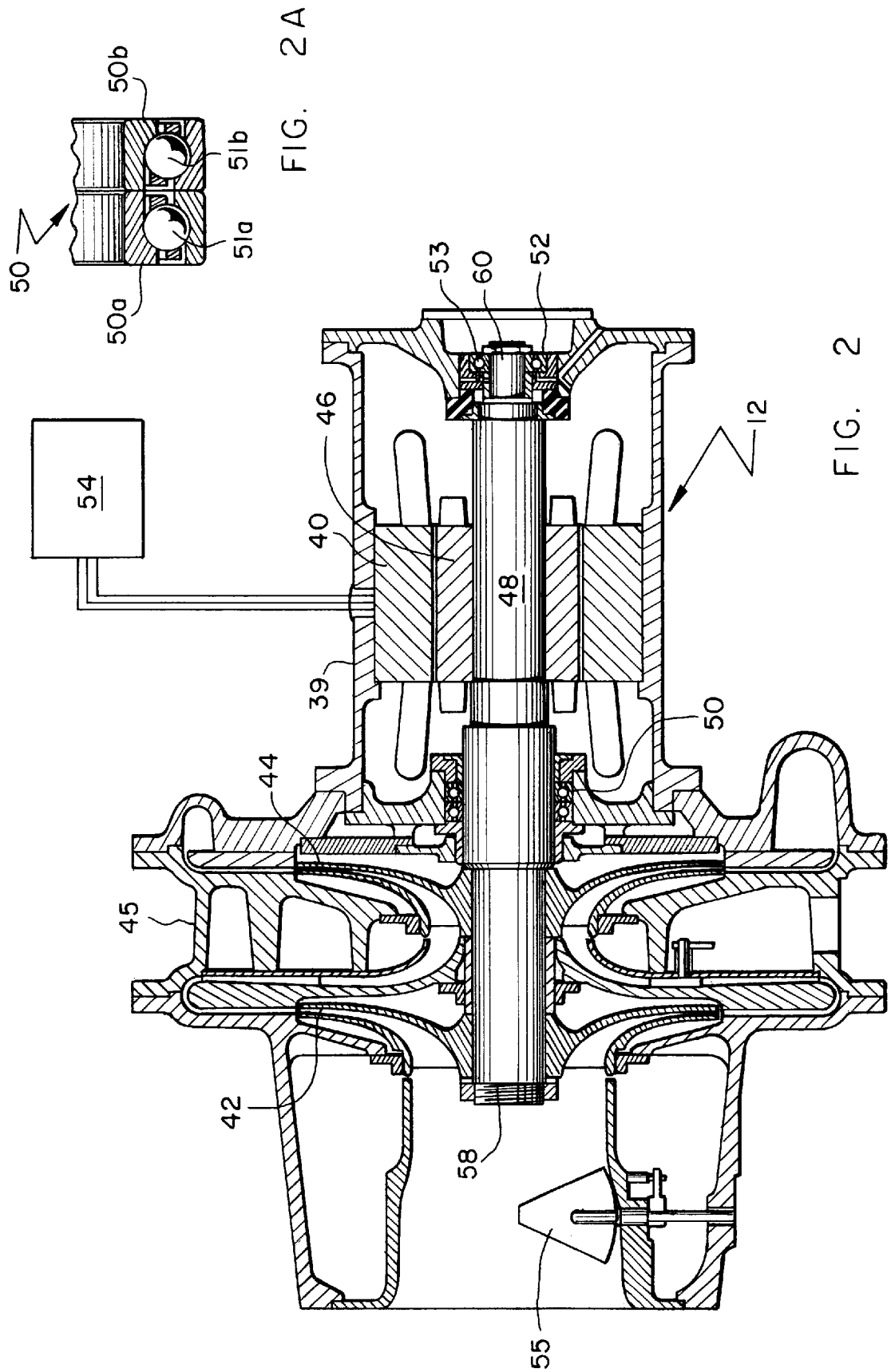

OIL-FREE LIQUID CHILLER

This application is a division of application Ser. No. 09/169,343, filed Oct. 9, 1998, now U.S. Pat. No. 6,176,092, and a division of application Ser. No. 09/578,622, filed May 25, 2000, now U.S. Pat. No. 6,279,340.

BACKGROUND OF THE INVENTION

This patent application is related to a commonly assigned U.S. patent application filed on even date herewith entitled "Liquid Chiller with Enhanced Motor Cooling and Lubrication" as well as allowed and commonly assigned U.S. patent application Ser. No. 08/965,495 entitled "Oil and Refrigerant Pump for Centrifugal Chiller" and any divisional applications that may derive therefrom.

The present invention relates to liquid chillers. More particularly, the present invention relates to relatively large tonnage centrifugal chillers in which so-called hybrid bearings are employed and in which the lubrication of such bearings is by the refrigerant which comprises the chiller's working fluid. With still more particularity, the present invention relates to oil-free, direct drive centrifugal water chillers capable of achieving optimized part load performance and in which the cooling of the chiller's compressor drive motor is enhanced.

Refrigeration chillers are machines that use a refrigerant fluid to temperature condition a liquid, such as water, most often for purposes of using such liquid as a cooling medium in an industrial process or to comfort condition the air in a building. Refrigeration chillers of larger capacity (from two hundred or so to thousands of tons of refrigeration) are typically driven by large centrifugal compressors. At lower capacities, compressors of the screw, scroll or reciprocating type are most often used in water chiller applications.

Centrifugal compressors are compressors which, by the rotation of one or more impellers in a volute housing, compress a refrigerant gas for use in the chiller's refrigeration circuit. The impeller or impellers of a centrifugal compressor, the shaft on which they are mounted and, in the case of so-called direct drive compressors, the rotor of the compressor drive motor, weigh hundreds if not thousands of pounds. The high speed rotation of such physically large and heavy chiller components at several thousand RPM results in unique and challenging bearing lubrication issues, particularly at start-up when these components are at rest, but also during chiller shutdown when these components coast to a stop.

Centrifugal compressors are of the direct drive or gear drive type. Hence, the chillers in which such compressors are used are generally referred to as direct drive chillers or gear drive chillers.

In direct drive chillers, the rotor of the compressor's drive motor is mounted directly to the shaft on which the compressor's one or more impellers are mounted. That shaft, in turn, is typically mounted for rotation in one or more bearings which are in need of lubrication when the chiller is in operation.

In gear drive centrifugal chillers the shaft on which the one or more impellers are mounted is driven through a series of gears rather than by the direct mounting of the rotor of the compressor drive motor to the shaft on which the impellers are mounted. The gears of a gear drive chiller act to increase the speed of rotation of the impeller beyond that of the motor which drives the impeller and in so doing increase the refrigeration effect or capacity of the chiller. In the case of a gear drive chiller, both the drive gears and the bearings in which the impeller shaft rotates require lubrication, heretofore by oil, and both direct drive and gear drive chillers have most typically employed induction motors, the speeds of which are typically limited to 3600 RPM.

It can generally be stated that chillers of the direct drive type are quieter and more efficient than chillers of the gear drive type. Further, chillers of the direct drive type are viewed as being more reliable than present day chillers of the gear drive type for the reason that chillers of the gear drive type make use of multiple gears, more bearings and other rotating parts, not found in a direct drive chiller, which are susceptible to breakage and/or wear. Gear drive chillers do, however, offer certain advantages in some applications, including, in some instances, a cost advantage over direct drive chillers.

In the cases of both direct drive and gear drive large tonnage centrifugal chillers, lubrication of their rotating components has historically proven both challenging and expensive and has been exclusively or at least fundamentally accomplished by the use of oil as the lubricant. The need for such lubrication systems has vastly complicated the design, manufacture, operation, maintenance and control of centrifugal chillers of both the direct drive and gear drive type and has added great initial and operational cost to them.

Elimination of oil as a lubricant in a large tonnage centrifugal refrigeration chiller system and the use of the refrigerant which comprises the chiller's working fluid for that purpose offers potentially tremendous advantages. Among those advantages are: elimination of many chiller failure modes associated with oil-based chiller lubrication systems; elimination of so-called oil migration problems associated with the mixing of oil and refrigerant in such chiller systems; enhancement of overall system efficiency by eliminating the oil-coating of heat exchange surfaces that results from the entrainment of oil in system refrigerant and the carrying of that entrained oil into a chiller's heat exchangers; elimination of what is viewed as an environmentally unfriendly material (oil) from the chiller system as well as the problems and costs associated with the handling and disposal thereof; and, elimination of a great number of expensive and relatively complex components associated with chiller lubrication systems as well as the control and maintenance costs associated therewith.

Further, the elimination of oil as a lubricant in a centrifugal chiller system suggests the possibility of a centrifugal chiller that offers the advantages of direct drive machines yet which, by virtue of variable speed operation, is fully the equal of or superior to gear drive machines. Heretofore, particularly good part load efficiencies have been achieved in gear drive machines by the use of specially configured gear sets capable of driving a chiller's impeller at relatively very high and/or optimal speeds. As was noted earlier, however, gear drive machines do not offer many of the advantages of direct drive machines and their use brings several distinct disadvantages, the need for an oil-based lubrication system for the purpose of ensuring the adequate lubrication of the gear train being one of them.

There have been and continue to be efforts to eliminate the need for oil-based lubrication systems in centrifugal chiller applications. Such efforts have, however, heretofore focused primarily on specialized small capacity refrigeration machines in which the bearing-mounted shaft and impeller are relatively very small and lightweight and on the use of hydrostatic, hydrodynamic and magnetic bearings in applications where bearing loads are relatively very light. In that regard, hydrostatic and hydrodynamic bearings are journal-type bearings which, while relatively low cost, simple and technically well understood, are intolerant of the momentary loss or reduction of lubricant flow. The intolerance of such bearings to the loss or reduction of lubricant available to them is exacerbated in a refrigerant environment. Further, such bearings detract from the efficiency of the compressor's in which they are used as a result of the frictional losses that are inherent in such bearings as compared to the frictional loses associated with rolling element bearings.

While hydrodynamic and hydrostatic bearings lubricated by refrigerant may have been at least prospectively employed in specialized, relatively physically small capacity compressors, the use of such bearings in large tonnage centrifugal chillers poses significant difficulties due, among other things, to the masses and weights of the chiller impellers and shafts that must be rotationally started and supported in that application. The sizes and weights of such components are such as to present significant design difficulties, particularly at chiller start-up and shutdown and during momentary loss of lubricant flow, which are yet to be overcome in the industry.

Further, even if such design difficulties are capable of being overcome with respect to the use of refrigerant-lubricated hydrostatic or hydrodynamic bearings in large tonnage refrigeration chillers, the efficiency penalties incurred in the use of such bearings due to the inherent frictional losses associated with them is disadvantageous. That disadvantage becomes larger and larger as real world issues, such as global warming, drive the need for energy consuming equipment to operate more efficiently.

Still further, the employment of hydrostatic bearings is additionally disadvantageous as a result of the need in such systems for a pump by which to deliver relatively very high pressure liquid refrigerant to such bearings in the absence of oil, the bearings of such pumps themselves requiring lubrication in operation. Such high pressure pumps are seen to be subject to breakdown and, potentially, pose an issue of chiller reliability where hydrostatic bearing arrangements are attempted to be used.

Even further and more generally speaking, the employment of liquid refrigerant to lubricate bearings of any type in the absence of oil in a chiller system presumes the reliable availability of a supply of refrigerant in the liquid state whenever the compressor is operating and the ability to deliver such refrigerant to the bearings. However, there is essentially no single location within a chiller that contains liquid refrigerant that is capable of being delivered to such bearings under all prospective chiller operating conditions in a form or state that is appropriate for bearing lubrication. In that regard, when a chiller is shutdown and even at very low load conditions, liquid refrigerant will tend to be most reliably available from the evaporator. When the chiller is operating at load, the condenser is the most reliable source of liquid refrigerant. Therefore, the prospective lubrication of bearings by liquid refrigerant requires that an assured source of liquid refrigerant be provided for whether the chiller is shutdown, starting up, under very low load, operating at load or is coasting to a stop after it is shutdown.

An exciting opportunity exists, (1.) to achieve all of the advantages offered by direct drive centrifugal chillers, (2.) to simultaneously achieve enhanced part load chiller efficiencies, (3.) to eliminate the use of oil-based lubrication systems and (4.) to increase overall chiller efficiency, in the prospective use in refrigeration chillers of rolling element, as opposed to journal-type bearings, where the rolling element bearings are lubricated only by the refrigerant which comprises the chiller's working fluid. The possibility of eliminating oil as a lubricant in centrifugal chiller systems has become a reality with the recent advent of so-called hybrid rolling element bearings in which at least the rolling elements thereof (which are significantly less expensive than the bearing races to fabricate), are fabricated from a ceramic material. Although such bearings have been commercially available for a few years and although there has been speculation with respect to the possibility of their use in relatively very small refrigeration chillers, their actual use has primarily been in machine tool applications and in such applications, lubrication of such bearings has been and is recommended by the bearing manufacturer to be by the use of grease or, preferably, oil.

Certain of the characteristics of such bearings have, however, suggested to applicants the possibility of a large capacity centrifugal refrigeration chiller which eliminates the use of oil as a lubricant and the substitution of the chiller's working fluid therefor, even with respect to bearing lubrication. Further, such bearings are particularly well suited for high and variable speed operation as a result of the relatively lower mass of ceramic rolling elements as compared to their steel counterparts, such reduced mass resulting in reduced centrifugal forces within hybrid bearings at high speeds which, in turn, results in a reduction in the forces the bearing races must withstand during high speed operation. The use of the chiller's working fluid as the lubricant for such bearings and the need to ensure the availability of such liquid for that purpose from one source or another under all chiller operating conditions does, however, present many new and unique challenges that must be overcome.

SUMMARY OF THE INVENTION

It is an object of the present invention to eliminate the need for oil as a lubricant in a centrifugal refrigeration chiller.

It is another object of the present invention to provide a centrifugal refrigeration chiller in which the bearings thereof are lubricated, in a manner which adequately removes heat from the bearing location, by the refrigerant which comprises the working fluid of the chiller system.

It is still another object of the present invention to provide a centrifugal chiller in which the bearings thereof are lubricated by the liquid refrigerant which comprises the working fluid of the chiller system and wherein a supply of liquid refrigerant from one location or another within the chiller is assured as the chiller starts up, when it operates at very low loads, when it operates at load and when it shuts down and the compressor apparatus of the chiller coasts to a stop.

It is a further object of the present invention to eliminate oil migration problems and the need to return oil from chiller system heat exchangers to the chiller's compressor as a result of the migration of oil to those heat exchangers during chiller operation.

It is a still further object of the present invention to, by the elimination of oil migration, increase chiller system efficiency by eliminating the oil-coating of heat exchange surfaces in the chiller system's heat exchangers and the resulting diminishment of the heat transfer process that results therefrom.

It is another object of the present invention to provide a centrifugal chiller which, by the use of rolling element bearings lubricated by refrigerant rather than oil, is of increased efficiency as compared to systems in which bearings of other than the rolling element type are used.

It is a still further object of the present invention to eliminate an environmentally unfriendly material, that material being oil, from refrigeration chillers and to eliminate the need to handle and dispose of that material.

It is a further object of the present invention to eliminate the many expensive and complex components associated with the lubrication by oil of centrifugal chiller components as well as the failure modes and manufacturing costs associated therewith and the costs imposed thereby in terms of controlling an oil-based chiller lubrication system.

It is another object of the present invention to provide a centrifugal chiller which is capable of both high speed and variable speed operation so as to enhance system part load efficiency, preferably using relatively conventional and inexpensive induction motor technology.

It is also an object of the present invention to provide a cost competitive multi-stage, direct drive centrifugal chiller capable of part load performance equaling that of a gear drive chiller in which the need for an oil-based lubrication system is eliminated.

It is a still further object of the present invention to provide an oil-free centrifugal chiller in which system refrigerant is available to the chiller's bearings in sufficient quantity, at all times necessary and in the proper state, to assure their adequate lubrication.

It is an additional object of the present invention to provide, an oil-free centrifugal chiller in which the centrifugal forces to which the bearings of the chiller are exposed, at high operational speeds, are reduced by the use of ceramic rolling elements which are of less mass than rolling elements used in conventional steel bearings.

It is still another object of the present invention to provide for enhanced cooling of the compressor drive motor of a centrifugal refrigeration chiller.

These and other objects of the present invention, which will be appreciated by reference to the following Description of the Preferred Embodiment and attached drawing figures, are accomplished in a refrigeration chiller wherein the shaft on which the chiller's impellers and drive motor rotor are mounted is itself mounted for rotation in so-called hybrid rolling element bearings, such bearings being lubricated and cooled, in the absence of oil, by the refrigerant which comprises the chiller's working fluid. Apparatus is provided which ensures that system refrigerant, in the appropriate state and amount, is available to the bearings for lubrication and heat removal purposes at chiller start-up, during chiller operation and for a sufficient period of time subsequent to chiller shutdown during which the shaft on which the chiller's impellers and drive motor rotor are mounted coasts to a stop and to the compressor drive motor for motor cooling purposes. Additionally, by the use of an induction motor and a variable speed drive capable, superior part load efficiency is achieved, all in a refrigeration chiller having the reliability advantages offered by direct drive but which avoids the efficiency and reliability disadvantages associated with gear drive machines and the need for an oil-based lubrication system associated with the gear set thereof.

DESCRIPTION OF THE DRAWING FIGURES

FIG. 2 is a cross-sectional view of the compressor portion of the centrifugal chiller of FIG. 1 illustrating the primary components of the compressor.

FIG. 2A is an enlarged view of the back-to-back bearing arrangement of bearing package 50 of FIG. 2.

Figure 3:
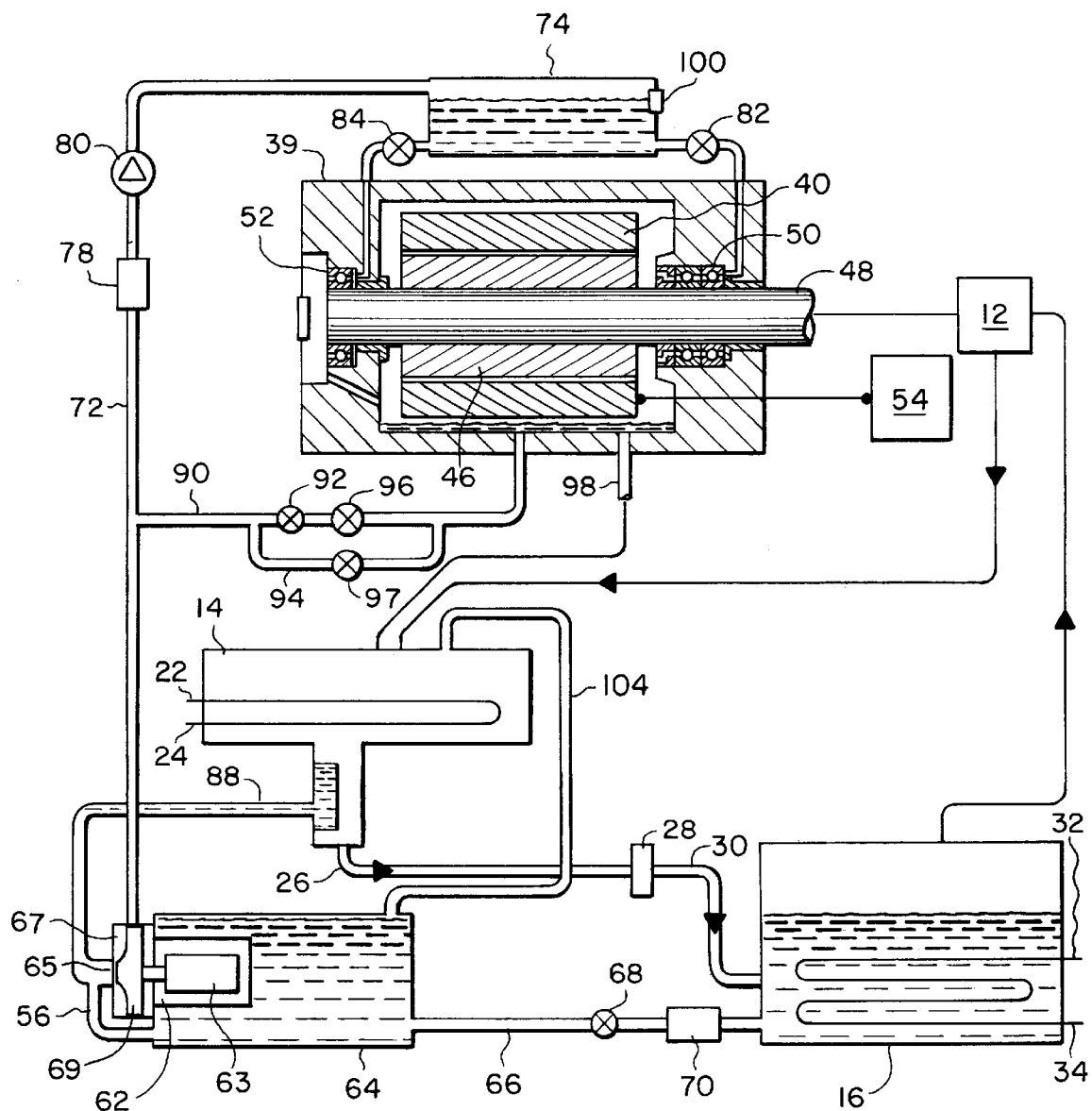

FIG. 3 schematically illustrates the chiller lubrication system of the present invention.

Figure 4:
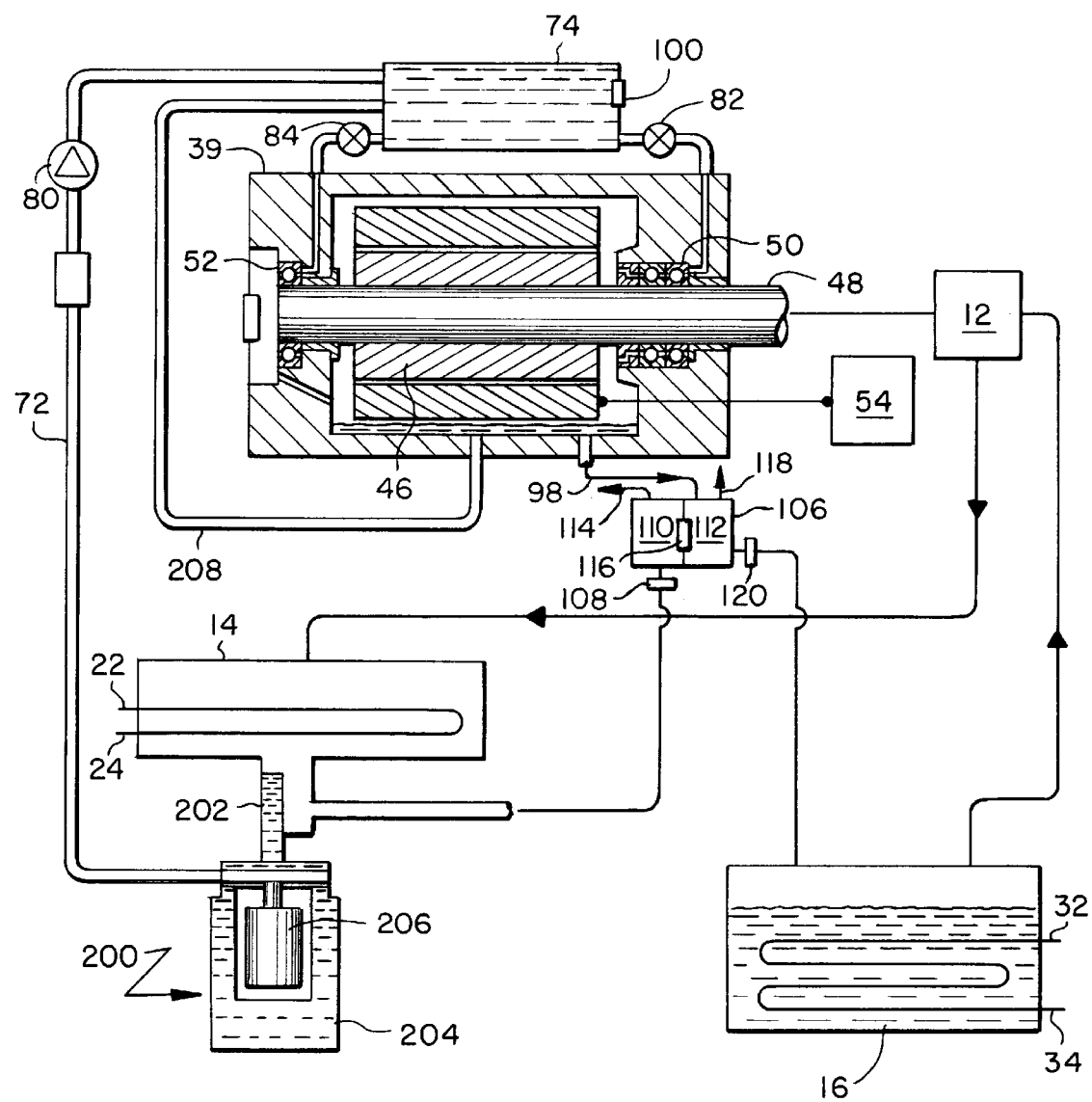

FIG. 4 schematically illustrates an alternative embodiment of the chiller lubrication system of the present invention.

Figure 5:
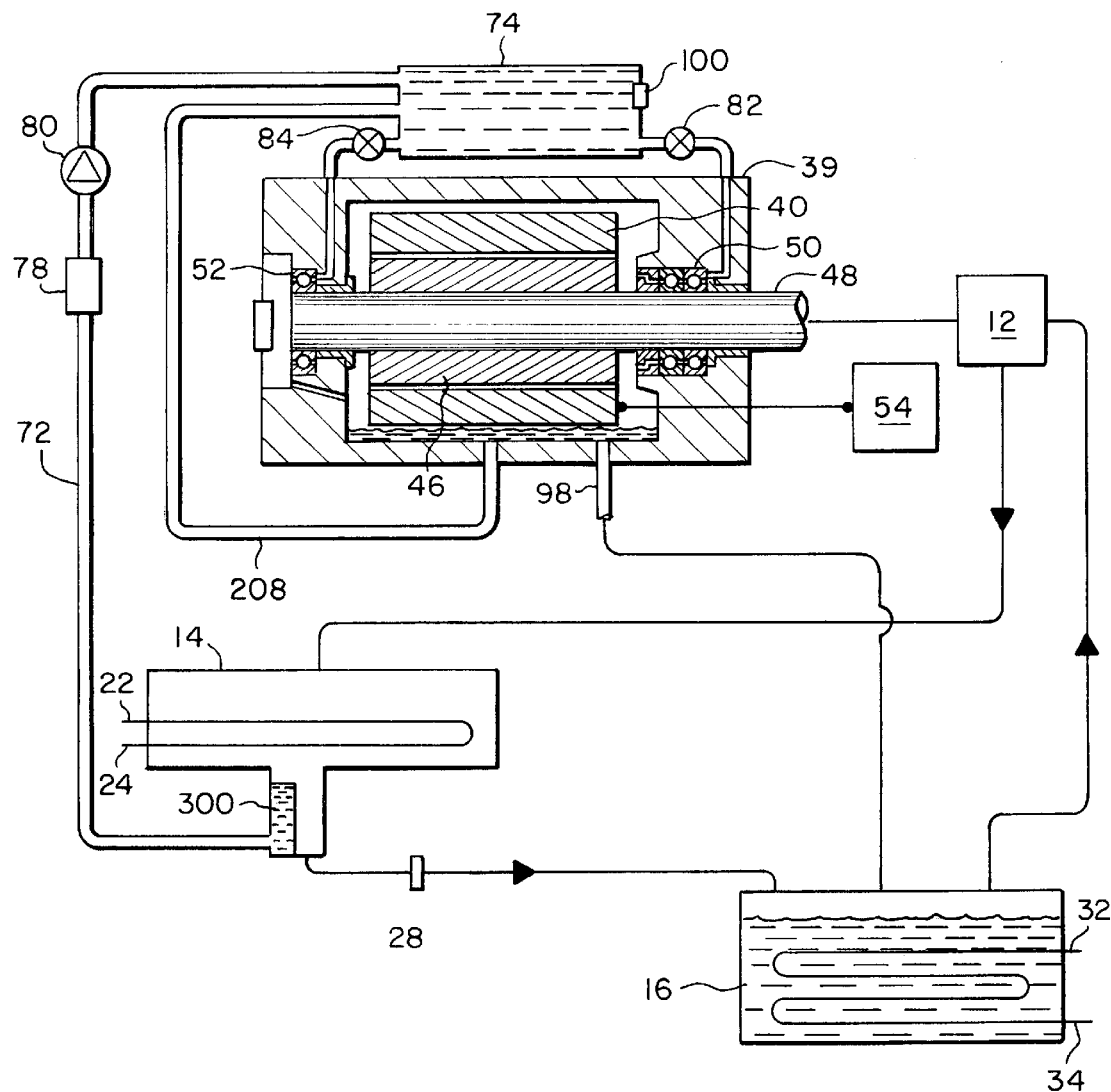

FIG. 5 schematically illustrates still another alternate embodiment of the present invention.

Figure 6:
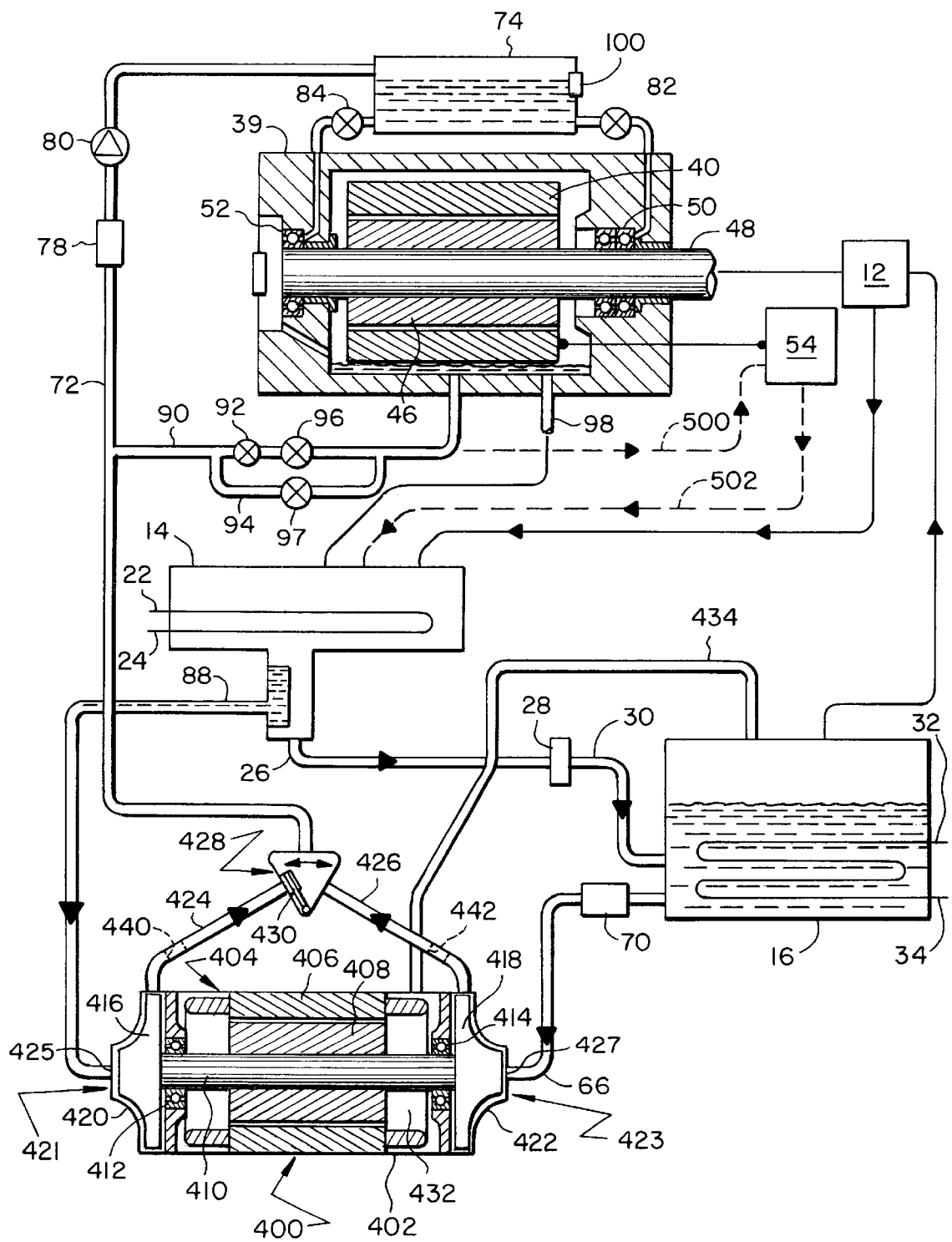

FIG. 6 schematically illustrates still another alternate embodiment of the present invention.

DESCRIPTION OF THE PREFERRED EMBODIMENT

Figure 1A:
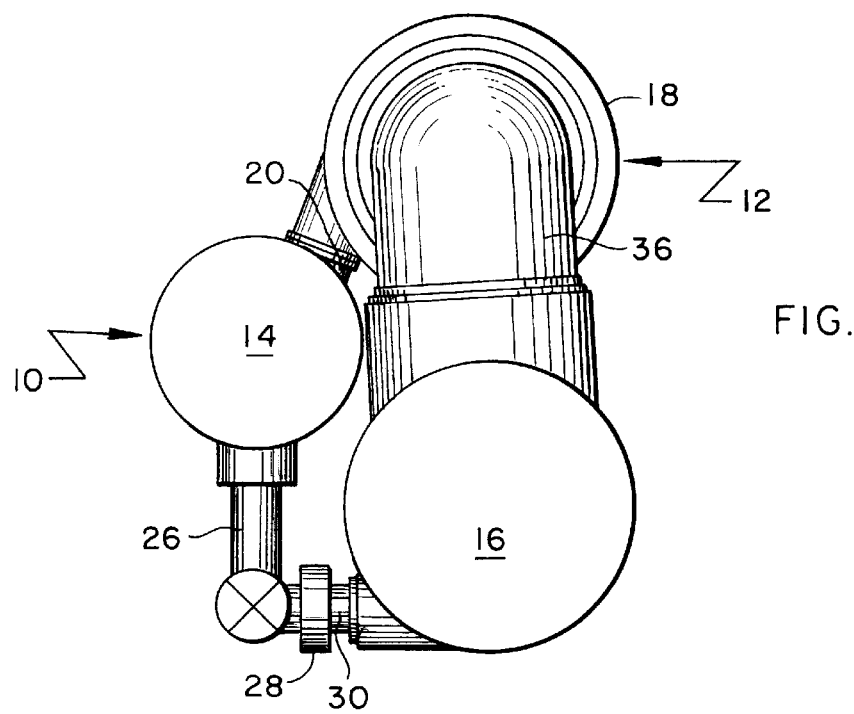
FIGS. 1a and 1b are end and top views of the centrifugal refrigeration chiller of the present invention.
Figure 1B:
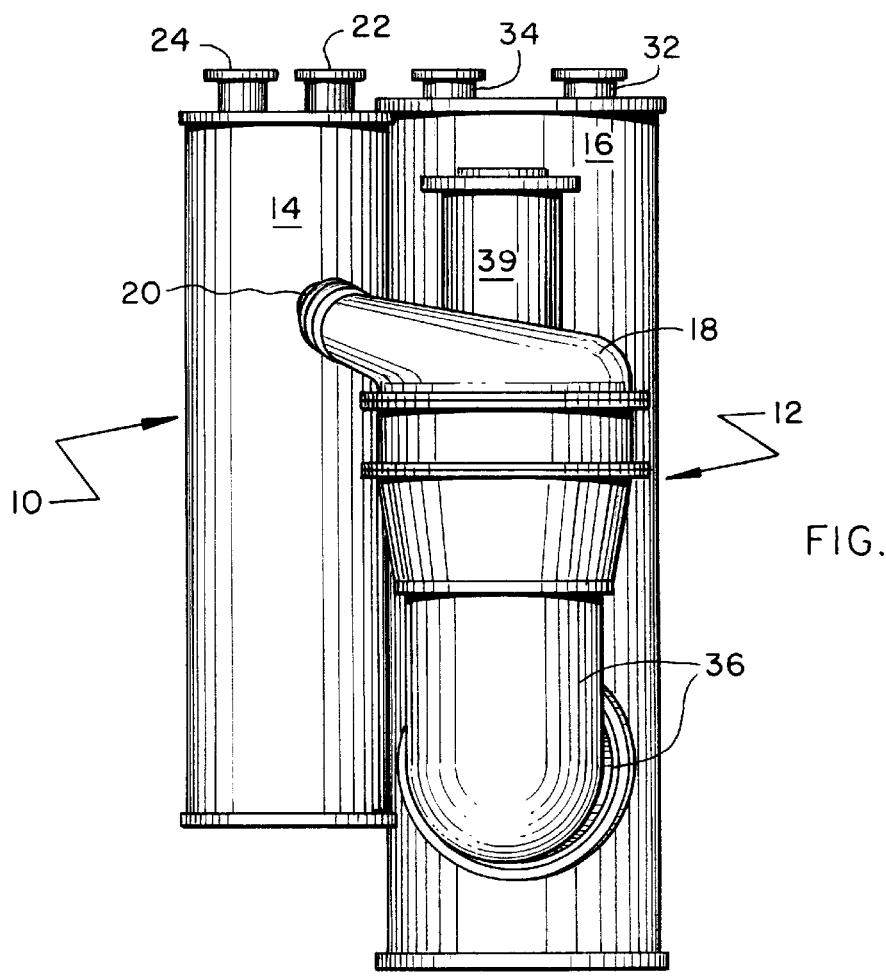

Referring to Drawing FIGS. 1a and 1b, a chiller 10, which in the preferred embodiment is a centrifugal chiller, and its basic components are illustrated. In that regard, chiller 10 is comprised of a compressor portion 12, a condenser 14 and an evaporator 16. Refrigerant gas is compressed within compressor portion 12. Such refrigerant gas is directed out of discharge volute 18 into piping 20 which connects the compressor to condenser 14.

Condenser 14 will typically be cooled by a liquid which enters the condenser through inlet 22 and exits through outlet 24. This liquid, which is typically city water or water that passes to, through and back from a cooling tower, exits the condenser after having been heated in a heat exchange relationship with the hot, compressed system refrigerant which is directed out of the compressor into the condenser in a gaseous state.

The heat exchange process occurring within condenser 14 causes the relatively hot, compressed refrigerant gas delivered thereinto to condense and pool as a relatively much cooler liquid in the bottom of the condenser. The condensed refrigerant is then directed out of condenser 14, through discharge piping 26, to a metering device 28 which, in the preferred embodiment, is a fixed orifice. That refrigerant, in its passage through metering device 28, is reduced in pressure and is still further cooled by the process of expansion and is next delivered, primarily in liquid form, through piping 30 into evaporator 16.

Refrigerant passing into and through evaporator 16 undergoes a heat exchange relationship with a medium, such as water, which enters the evaporator through an inlet 32 and exits the evaporator through outlet 34. In the process of cooling the medium which flows through the evaporator and being heated thereby, system refrigerant vaporizes and is directed, as a relatively low pressure but relatively warm gas, through piping 36 back to the compressor. It is there again compressed and heated in an ongoing and repetitive process.

Referring additionally now to FIGS. 2 and 2a, compressor portion 12 of chiller 10 includes a housing 39 in which chiller drive motor 40 is disposed. Impellers 42 and 44 are disposed in volute housing 45 and are, together with rotor 46 of drive motor 40, mounted for rotation on shaft 48. Shaft 48, in turn, is mounted for rotation in first bearing package 50 and second bearing 52. It is to be noted that although the present invention is, in its preferred embodiment, a centrifugal chiller, chillers driven by other than centrifugal compressors fall within its scope. In such cases, the compressive element mounted on shaft 48 might be the rotor of a rotary screw compressor (in which case chiller 10 would be a screw chiller).

As will be apparent, the centrifugal chiller of the preferred embodiment is a so-called direct drive chiller, having the rotor 46 of its drive motor 40 mounted directly to the shaft 48 on which the compressor's impellers are mounted. Drive motor 40 of compressor 12 is, in the preferred embodiment, a somewhat structurally strengthened (as will further be explained) but essentially conventional induction motor which is driven by a variable speed drive 54 although other kinds of variable speed motors are contemplated as falling within the scope of the present invention.

By the use of drive 54, chiller 10 and its compressor can be operated at lower speeds when the load on the chiller system does not require the operation of the compressor at maximum capacity and at higher speeds when there is an increased demand for chiller capacity. By running compressor 12 and its impellers at lower speeds when the load on the chiller is not high or at its maximum, sufficient refrigeration effect can be provided to cool the reduced heat load in a manner which saves energy, making the chiller more economical from a cost-to-run standpoint and making chiller operation extremely efficient as compared to chillers which are incapable of such load matching. Additionally, compressor 12 may employ inlet guide vanes 55 which, in cooperation with the controlled speed of motor 40, permit very precise control of chiller capacity so that chiller output closely and responsively matches the system load, all while using as little energy as possible and eliminating the need for specially designed drive gears optimized for a specific chiller application, the need for relatively more exotic and expensive variable speed drives and/or motors or the need for an oil system to provide for the lubrication of bearings and/or a gear train.

In the preferred embodiment, compressor 12 is a two-stage compressor. The two-stage nomenclature indicates that there are two distinct stages of gas compression within the chiller's compressor portion. Such two-stage compression is accomplished by increasing the pressure of the system refrigerant a first time by passing it to, through and past first stage impeller 42 and then by communicating such once-compressed gas to, through and past second stage impeller 44 which increases the pressure of the refrigerant a second time. While compressor 12 is a two-stage compressor in the preferred embodiment, it is to be understood that the present invention is applicable not only to two-stage compressors/chillers but to single stage and other multiple stage chiller's as well.

Referring particularly now to FIGS. 2 and 2a, the bearing arrangement associated with shaft 48 will more thoroughly be described. Shaft 48, as earlier noted, is supported for rotation in bearing package 50, which, in the preferred embodiment, is comprised of first and second rolling element bearings 50a and 50b and carries both the thrust load and the majority of the radial load imposed through shaft 48 by the operation of compressor 12. Bearing 52, which is an axially floating, single angular-contact bearing having a rolling element 53, takes up a relatively small portion of the radial load and a portion of the thrust load. Bearing 52 is, however, preloaded in a direction which is opposite the thrust direction of the primary thrust load so as to minimize the net thrust load on bearing 50b which carries the majority of the thrust load.

Bearing package 50 is disposed approximately halfway down the length of shaft 48 and bearings 50a and 50b are back-to-back, preloaded, angular-contact rolling element bearings. The rolling elements 51a and 51b of bearings 50a, 50b and the rolling element of bearing 52 will preferably be balls rather than rollers so as to reduce the cost of the bearings. Bearings 50a and 50b could, alternatively, be oriented in a face-to-face manner. In any event, the races of bearings 50a and 50b are oppositely oriented, as best illustrated in FIG. 2a, so as to take up the thrust loads imposed through shaft 48 irrespective of the direction of that thrust load. These bearings also carry the majority of the radial load imposed through shaft 48.

Impellers 42 and 44 are mounted on shaft 48 on one side of bearing package 50 while drive motor rotor 46 is mounted on the other. Bearing package 50 is located along shaft 48 such that the weight of the shaft and impellers on one side of the bearing package essentially balance the weight of the shaft and motor rotor located on the other side of that bearing package. The impellers and the portion of shaft 48 on which they are mounted are, however, cantilevered in the preferred embodiment and are thus unsupported at distal end 58 of the drive shaft. The other portion of the drive shaft and its distal end 60, as earlier noted, is to some extent radially supported and carried in bearing 52. It is to be noted that the mounting of shaft 48 in a single bearing or bearing package, depending upon the design of such bearing or bearings, is possible but also that different bearing arrangements and locations are contemplated as being within the scope of the invention.

In the chiller of the preferred embodiment, the bearings that comprise bearing package 50 are relatively large bore bearings. Their location between drive motor rotor 46 and impellers 42 and 44 permits the diameter of shaft 48 to be large which, together with the bearing radial stiffness that results therefrom, enhances compressor operation by elevating critical speeds so that they are higher than the shaft will see in operation. As such, critical speeds are avoided.

In the past, many chiller manufacturers have been dissuaded from using rolling element bearings to support the impeller shaft of a centrifugal compressor for rotation, particularly where the portion of the shaft on which the chiller's impellers are mounted is cantilevered from a support bearing. Rather, such manufacturers have resorted to the use of journal bearings which, while relatively low cost, are very intolerant to reduced or poor lubrication (a disadvantage which is exacerbated in a refrigerant environment) and result in increased frictional losses that are to the detriment of both compressor and overall chiller efficiency. While the assignee of the present invention has long successfully manufactured centrifugal chillers having compressors the impeller shafts of which are mounted in rolling element bearings, those rolling element bearings have heretofore required lubrication by oil.

With the advent of so-called hybrid bearings of the rolling element type which, as of the filing date hereof, have only recently come to be commercially available, thought has turned to the possibility of eliminating oil as a lubricant in centrifugal chillers by the use of such bearings in direct drive machines to mount the shaft on which the chiller's motor rotor and impellers are mounted. Such hybrid bearings can be characterized as rolling element bearings that, applicants have found, are capable of being lubricated by refrigerant, in the absence of oil despite manufacturer's contrary position that oil is the preferred lubricant of such bearings with grease being a lesser alternative.

The hybrid bearings, in the preferred embodiment of the present invention, use non-metallic rolling elements which are fabricated from a ceramic material. The use of a ceramic material, such as silicon nitride, results in rolling elements that are of on the order of 60% less dense, have a modulus of elasticity up to 50% higher, thermally expand only 30% as much as steel bearings and have a coefficient of friction on the order of 20% of that of rolling elements fabricated from steel.

Because of the reduced density of ceramic rolling elements, the bearings in which they are used are subject to significantly reduced centrifugal force. The higher modulus of elasticity reduces friction in such bearings and makes such bearings stiffer, which reduces distortion and friction. Reduced distortion in these bearings increases, in turn, critical speeds in the machines in which they are employed. Reduced thermal expansion minimizes bearing preload variation and likewise reduces friction and increases bearing life. This is significant in refrigeration chiller applications where bearings are exposed to widely varying temperatures. While the races in which such ceramic rolling elements run are, in the preferred embodiment, fabricated from steel, making such bearings "hybrid" bearings, they could likewise be fabricated from a ceramic material.

Applicants have found that the running of such ceramic rolling elements on and within steel races results in the creation of a mirror-like finish on the surfaces of the races due to the hardness and smoothness of the ceramic rolling elements that run on them. Applicants have also found that given this characteristic of such bearings, only a relatively very thin elastohydrodynamic film is required to provide adequate lubrication for such bearings.

In that regard, applicants have found that by providing refrigerant, which comprises the working fluid of a centrifugal chiller, primarily and preferably in the liquid state and at appropriate times and in appropriate quantities to hybrid bearings, such bearings are provided adequate lubrication, are adequately cooled and can function across the operating envelope of a chiller in the absence of oil as a lubricant. That possibility does not exist with conventional bearing technology, where both the rolling elements and races in which they run are fabricated from steel, for the reason that the characteristics of refrigerant are not such as to provide a sufficiently thick film between such conventional rolling elements and races for lubrication purposes.

In the present invention, by the use of hybrid bearings and liquid refrigerant to lubricate them, a thin but sufficiently thick elastohydrodynamic film between the ceramic rolling elements and the races in which they run is created which has been found to be sufficient for bearing lubrication purposes. With the hybrid bearings used in the present invention, not only is the film created by system refrigerant sufficient for lubrication purposes, it has been found that even if the ceramic rolling elements do momentarily make contact across the refrigerant film with the steel races on which they run, the rolling elements and races continue to function and are not susceptible to "welding" together (as conventional steel bearings are prone to do) due to the fabrication of the rolling elements and races from significantly dissimilar base materials.

Applicants have also found, in developing the centrifugal chiller of the present invention, that refrigerant supplied to such hybrid bearings for lubrication purposes will preferably be all or essentially all in the liquid state. The liquid refrigerant delivered to such bearings serves two purposes, the first being to create the thin elastohydrodynamic film necessary to lubricate the bearing as between its ceramic rolling elements and its steel races and the second being to carry the heat of friction away from the bearing location. As such, the liquid refrigerant delivered to the bearings for lubrication purposes must be in a state such that an excessive percentage of it does not flash to gas on contact with the bearings which will be relatively warm in operation.

Applicants have therefore established a design parameter, with respect to the chiller system of their invention, to deliver liquid refrigerant at a sufficient rate of flow to the bearing locations such that the amount of refrigerant discharged from those locations in the liquid state, after its use in the bearing lubrication process, comprises an amount equal to 80% of the liquid refrigerant delivered to those locations. By allowing for up to an approximately 20% rate of refrigerant flashing at the location of the bearings under fringe chiller operating conditions, it has been found that an adequate amount of liquid refrigerant will, under all foreseeable chiller operating conditions, be available for bearing lubrication and heat removal purposes. That rate of flashing, while not necessarily an upper limit, is one with which applicants are comfortable at this stage of development.

Despite the many advantages associated with the elimination of the need for oil in centrifugal chiller systems, an anomaly associated with the use of refrigerant to lubricate the hybrid bearings in such systems has, however, been discovered which creates a difficulty where none existed in oil-based lubrication systems. In that regard, when oil is used as a lubricant in a chiller system, a portion of the oil adheres to and is maintained on the bearing surfaces as a film for a relatively long period of time after the chiller and its active oil delivery system is shutdown. As such, when oil is used as a bearing lubricant, at least some of it will remain on the bearing surfaces to provide for initial bearing lubrication when the chiller next starts up. Such residual oil can, to at least some extent, be relied upon to lubricate the bearings until the chiller's oil delivery system comes to actively provide oil to the bearing locations.

When refrigerant is used as a bearing lubricant, little or no residual refrigerant has been found to remain on the bearing surfaces when the chiller system shuts down. Rather, any refrigerant at the bearing locations when the system is shutdown drains away from or boils off of the bearing surfaces leaving an essentially dry bearing. As such, lubrication of the bearings in a centrifugal chiller employing hybrid bearings lubricated exclusively by refrigerant presents unique difficulties and challenges both at chiller start-up and subsequent to chiller shutdown. Those problems have been successfully addressed by the chiller lubrication system illustrated schematically in FIG. 3 which ensures the delivery of liquid refrigerant to bearing package 50 and bearing 52 at compressor start-up, during normal chiller operation and for the relatively lengthy period of time after the chiller shuts down during which shaft 48 coasts to a stop.

Referring additionally now to FIG. 3, lubrication of bearing package 50 and bearing 52 at chiller start-up is accomplished by providing a source of liquid refrigerant from a location within the chiller in which liquid refrigerant resides while the chiller is shutdown. In that regard, when a chiller start-up signal is received, liquid refrigerant pump 62 pumps liquid refrigerant from refrigerant sump 64. Pump 62 is capable of pumping saturated liquid refrigerant without causing a significant amount of the liquid refrigerant to flash to gas as a result of the pumping process. Sump 64, as will subsequently be described, is in selective flow communication, through line 66, with system evaporator 16. Disposed in line 66 is a fill valve 68 which is open when the chiller is shutdown and, optionally, a screen 70 for removing any impurities/debris that might otherwise make its way into sump 64 from the evaporator.

When a chiller shuts down, the internal temperature and pressure conditions within a chiller are such that the refrigerant therein will migrate to the evaporator as temperatures and pressures within the chiller system equalize. Further, because the evaporator is the coldest portion of the chiller at the time the chiller shuts down, not only will refrigerant migrate to that location, it will condense there to liquid form. Therefore, when the chiller next starts up, at least the majority of the refrigerant in the chiller system can be expected to reside in the evaporator in the liquid state.

Refrigerant sump 64 is positioned on chiller 10 such that when fill valve 68 is open, liquid refrigerant pooled in evaporator 16 will drain to and fill refrigerant sump 64. When the chiller is called upon to start-up, fill valve 68 is closed which isolates refrigerant sump 64 from the evaporator. Absent the closure of valve 68 at this time, pump 62, which goes into operation when the chiller start-up sequence commences, would cavitate as the liquid refrigerant in the evaporator boils to gas due to the pressure drop that occurs quickly in the evaporator as the chiller starts up. It will be appreciated that sump 64, while a discrete volume, need not be a discrete structure but could be incorporated within another of the many housings/shells (including condenser 14 and evaporator 16) of which chiller 10 is comprised.

Refrigerant pump 62, the motor 63 of which resides within refrigerant sump 64, pumps liquid refrigerant from sump 64 through refrigerant line 72 to a liquid refrigerant reservoir 74 which is preferably located above the chiller's compressor section to facilitate delivery, with the assistance of gravity, of liquid refrigerant thereoutof to bearing locations. Sump 64 is sized to ensure that an adequate supply of liquid refrigerant will be available for bearing lubrication purposes during chiller start-up. Reservoir 74, as will further be described, is the source location from which refrigerant is delivered to bearing package 50 and bearing 52 for lubrication purposes and is a volume, like sump 64, that is discrete from condenser 14 and evaporator 16.

It is to be noted that pump 62 need only elevate the pressure of the liquid refrigerant it pumps a few PSI, so as to overcome the head against which it is pumping and the resistance of filter 78, if one is disposed in line 72, to ensure that liquid refrigerant is available for bearing lubrication purposes under all chiller operating conditions and circumstances. Contrarily, where hydrostatic bearings are employed, extremely high pressure "lubricant" must be made available to bearing surfaces under certain conditions such as at compressor start-up.

It is also to be noted that one problem associated with pumping saturated liquid refrigerant is maintaining the refrigerant in the liquid state within the pump. Any pressure depression in the liquid refrigerant within the pump causes some flashing which makes the liquid refrigerant difficult or impossible to pump. Even with the best pump design, this necessitates that some positive suction head be provided above the pump inlet. Therefore, the inlet 65 to the housing 67 in which pump impeller 69 is disposed must be below the liquid level of the liquid source. In the embodiment of FIG. 3, inlet 65 of impeller housing 67 is physically below the bottom of condenser 14 and is, additionally, below the level of the liquid refrigerant that will be found in sump 64 when the chiller starts up.

Disposed within line 72 is a check valve 80 which prevents backflow out of reservoir 74 into line 72. As will further be described, pump 62 also pumps liquid refrigerant through the line 72 to compressor drive motor housing 39 while the chiller is in operation. Such refrigerant is there brought into heat exchange contact with motor 40 in order to cool it.

Liquid refrigerant pumped to reservoir 74 is metered out of reservoir 74 to both bearing package 50 and bearing 52 through metering devices 82 and 84 respectively. Shortly after energization of pump 62, compressor motor 40 is started and shaft 48 begins to rotate with its bearings being fed liquid refrigerant as a lubricant which is sourced during the start-up period from sump 64.

Once chiller 10 is in operation, condenser 14 becomes the source of liquid refrigerant for bearing lubrication purposes. In that regard, once compressor 12 begins to deliver compressed refrigerant gas to condenser 14, the process of condensing it to the liquid state actively commences within the condenser. Such condensed liquid refrigerant pools at the bottom of the condenser and is directed thereoutof through piping 26 to metering device 28.

In addition to being in flow communication with refrigerant sump 64 via line 56, impeller housing 65 of refrigerant pump 62, through which refrigerant is pumped into line 72, is in open flow communication through line 88 with the lower portion of condenser 14. Therefore, once chiller 10 starts up and liquid refrigerant comes to be produced in sufficient quantity condenser 14, refrigerant pump 62 commences pumping liquid refrigerant out of condenser 14 through line 88. A constant flow of liquid refrigerant to reservoir 74 for bearing lubrication purposes and to compressor drive motor 40 for motor cooling purposes is thereby provided during chiller operation with condenser 14 being the source of the liquid refrigerant. Like sump 64, it is contemplated that reservoir 74 can be structurally incorporated into one or another of the housing/shells that comprise chiller 10 and that it need not be a stand alone structure although it is, once again, a defined volume which is discrete from condenser 14 and evaporator 16 in the sense that it is capable of being isolated under certain operational circumstances, with respect to flow and/or pressure, from them.

With respect to compressor drive motor cooling, compressor drive motor 40, in the chiller of the preferred embodiment, is cooled by the delivery of liquid refrigerant into direct or indirect contact with motor 40. As will be appreciated, the source of liquid refrigerant for motor cooling purposes is the same as the source of liquid refrigerant for bearing lubrication purposes.

In that regard, liquid refrigerant line 90, in which valve 92 is disposed, branches off from line 72 in the embodiment of FIG. 3 and liquid refrigerant is delivered therethrough into the interior of the drive motor housing 39 where it cools drive motor 40. Valve 92 is bypassed by line 94. In this embodiment, a first flow metering device 96 is disposed in line 90 upstream of the location at which bypass line 94 rejoins line 90 and a second metering device 97 is disposed in bypass line 94. The amount of liquid permitted to flow through device 97 is considerably less than the amount permitted to flow through metering device 96.

Valve 92 is open during chiller operation and provides liquid refrigerant to compressor 12 through both metering devices 96 and 97 in a predetermined quantity which is sufficient to cool the compressor drive motor. However, during the chiller start-up sequence, during the chiller coast-down period and while the chiller is shutdown, valve 92 will be closed. As a result, liquid refrigerant flow out of line 72 into and through branch line 90 for motor cooling purposes is significantly reduced during the chiller start-up and coast-down time periods since such flow will only be through metering device 97. That, in turn, helps to ensure that adequate liquid refrigerant is available for bearing lubrication purposes during those periods which are, as it turns out, periods during which the need for compressor drive motor cooling is reduced.

Also, there are times when the chiller operates at on the order of 15% or less capacity. In such instances the condenser may not produce the quantity of liquid refrigerant necessary to provide for both sufficient liquid refrigerant flow to the bearings and unthrottled flow to the drive motor for motor cooling purposes. At such times, however, motor cooling requirements are reduced and valve 92 can similarly be closed to ensure that adequate liquid refrigerant is available for bearing lubrication under such light load conditions.

It is to be noted that liquid refrigerant delivered to the compressor's bearings will, in the preferred embodiment, drain from the bearings, subsequent to being used for lubrication purposes, into the interior of motor housing 39 and will drain thereoutof, together with the refrigerant used for motor cooling purposes, through a line 98 to condenser 14. Return of this refrigerant to the condenser is made possible by the use of pump 62 which, in operation, increases the pressure of the refrigerant used for bearing lubrication and motor cooling purposes to a pressure higher than condenser pressure irrespective of variations in condenser pressure while the chiller is operating. By returning such "used" refrigerant, which has been heated in the motor cooling process and in the process of removing heat from the bearing locations, to the condenser, the motor and bearing heat is carried out of the condenser and chiller by transfer to the cooling medium that flows through the condenser. As a result, the parasitic effect of this heat on the overall efficiency of the chiller is eliminated. In typical refrigeration systems, refrigerant used to cool the compressor drive motor is returned by the use of differential pressure to the evaporator, which is at significantly lower pressure than the condenser. In such systems, the delivery of such additional heat to the evaporator acts to reduce chiller efficiency and/or results in the need to provide additional heat transfer surface area within the evaporator to provide sufficient for both cooling the load on the chiller system and cooling the compressor drive motor which is a significant source of heat.

When chiller 10 is called upon to shut down, compressor motor 40 is de-energized. That, in turn, removes the driving force that causes shaft 48 of compressor 12 to rotate. However, because of the large mass of shaft 48 and the components mounted on it, the relatively very low friction of hybrid bearings and the high speed at which all of these components are rotating while in operation, shaft 48 continues to rotate for a relatively long period of time, measured on the order of several or more minutes, after the compressor drive motor is de-energized. During that coast-down period, liquid refrigerant must be provided to bearing package 50 and bearing 52 to provide for their lubrication until such time as shaft 48 coasts to a stop.

It will be remembered that so long as compressor 12 operates, the source of liquid refrigerant for bearing lubrication purposes will be the chiller condenser. Upon chiller shutdown, however, the supply of refrigerant gas to the condenser stops, pressure in the condenser drops rapidly and the liquid refrigerant in the condenser starts to boil. As such, very soon after chiller 10 is shutdown, the then-existing source of liquid refrigerant for bearing lubrication purposes comes to be unavailable as it flashes to gaseous form and another source for liquid refrigerant must be turned to for bearing lubrication purposes as shaft 48 coasts to a stop.

As an aside, it will be noted that refrigerant sump 64 is vented through line 104 to condenser 14 so that upon compressor shutdown, not only will the refrigerant in condenser 14 commence to boil to the gaseous state but any liquid refrigerant in refrigerant sump 64 will do likewise. Refrigerant pump 62 may be permitted to continue to run for a short period of time, on the order of 20 seconds or so, after compressor drive motor 40 is de-energized because sufficient liquid refrigerant will remain in condenser 14 and refrigerant sump 64 to permit pump 62 to continue pumping liquid refrigerant for that period of time. After that period of time pump 62 would commence cavitating as a result of the flashing of the liquid refrigerant to the gaseous state. Once again, however, the need for liquid refrigerant for bearing lubrication purposes extends to a matter of several minutes or more as shaft 48 coasts to a stop, not a matter of seconds.

As was earlier noted, a check valve 80 is disposed in line 72 which prevents flow out of reservoir 74 back through line 72. When refrigerant pump 62 is de-energized shortly after chiller shutdown, the pressure in line 72 upstream of check valve 80 drops and the pressure in reservoir 74 causes check valve 80 to seat. A sufficient amount of pressurized liquid refrigerant is thus trapped within reservoir 74 between check valve 80 and metering devices 82 and 84 to ensure that bearing package 50 and bearing 52 are provided adequate liquid refrigerant, by gravity feed and residual pressure, during the compressor coast-down period. Reservoir 74 is appropriately sized for that purpose. It is to be noted that reservoir 74 also ensures that a supply of lubricant in the form of liquid refrigerant is available to the compressor bearings for a sufficient period of time should power to the chiller be interrupted (even though pump 62 will not continue to operate as it would during a normal shutdown sequence where it continues to operate for a brief period of time subsequent to chiller shutdown).

After chiller shutdown, whether "normal" or in response to an abnormal condition such as interruption of power, when pressure has equalized across the chiller, fill valve 68 is again opened and refrigerant sump 64 fills with liquid refrigerant from evaporator 16. The system is then ready, from the bearing lubrication standpoint, to start once again.

It is to be noted that each time the chiller shuts down, it will be required to remain shut down for some relatively small period of time, such as ten minutes, during which refrigerant sump 64 refills with liquid refrigerant. In most circumstances, however, once chiller 10 shuts down, it will not normally be called upon to start-up for at least that amount of time irrespective of the need to refill reservoir 64. Therefore, the mandatory shutdown period for purposes of refilling reservoir 64 has little or no effect on chiller operation in real terms.

It has been noted that refrigerant pump 62 is disposed in refrigerant sump 64 and is bathed within the liquid refrigerant found therein. Because of its location, pump 62 can likewise make use of hybrid bearings lubricated by liquid refrigerant, eliminating a still further need for an oil-based lubrication system found in other refrigeration chillers. Further, because pump 62 is disposed within refrigerant sump 64, it and its motor are effectively kept cool by the liquid refrigerant in which they are immersed.

Referring to refrigerant reservoir 74, it is to be noted that a unique device 100, which is the subject of a co-pending patent application U.S. Ser. No. 08/924,228, likewise assigned to the assignee of the present invention, is used to "prove" the presence of liquid in reservoir 74. This device protects the compressor against failure by its ability to differentiate between the existence of liquid and gaseous foam in a flowing fluid.

As has been mentioned, lubrication of bearing package 50 and bearing 52 depends upon the continuous delivery to them of liquid refrigerant in sufficient quantity. By the use of flow proving device 100 which, if insufficient liquid content in the fluid flow passing through reservoir 74 is detected, causes chiller 10 to shutdown, the chiller is protected from damage or failure for lack of proper lubrication. The lubrication scheme of the present invention is therefore made subject to a safeguard which protects the chiller and its compressor against catastrophic damage should reservoir 74, for some reason, come to contain refrigerant which, to too great an extent, is other than in the liquid state. As will be appreciated, device 100 and the safeguarding of chiller 10, while important in the context of the commercial embodiment of chiller 10, is a peripheral feature with respect to the refrigerant-based lubrication system of the present invention.

Referring now to FIG. 4, an alternate embodiment of the present invention will be described, individual different features of which are capable of being employed in the FIG. 3 and other embodiments of the present invention that are found herein. In this embodiment of FIG. 4, refrigerant sump 64 of the preferred embodiment is eliminated in circumstances/applications where bearing package 50 and bearing 52 of compressor 12 can tolerate dry operation during the period of time, subsequent to chiller start-up, when the condensation process in condenser 14 is incapable of providing liquid refrigerant of the quality and in the quantity which becomes necessary for bearing lubrication purposes while the chiller is in steady state/normal operation. The embodiment of FIG. 4, while less costly and less complicated than the preferred embodiment, represents a more risky design philosophy which is predicated on the ability of hybrid bearings to run dry or essentially dry for some relatively small but permissible period of time at chiller start-up.

In the FIG. 4 embodiment, refrigerant pump 200 is disposed immediately adjacent liquid weir 202 of condenser 14 and is therefore capable of moving liquid refrigerant from that location to the bearings of the compressor as soon as such liquid becomes available. In this embodiment, liquid refrigerant produced in condenser 14 drains out of weir 202 into pump housing 204. Pump housing 204 is such that its motor 206 is bathed in liquid refrigerant which both cools the motor and provides a source of lubricant for the hybrid bearings used in pump 200 itself.

A delay in the start-up of pump 200 for a period of time after chiller start-up until such time as liquid refrigerant comes to be produced in condenser 14 prevents pump 200 from cavitating as it would otherwise do if it was started coincident with chiller start-up. During the period of time during which pump 200 remains de-energized, bearings 50 and 52 are permitted to run dry. As soon as liquid refrigerant comes to be available in weir 202, however, pump 200 is energized and liquid refrigerant is provided to those bearings for lubrication purposes.

Another mechanical modification in the system of FIG. 4 which is applicable to others of the embodiments herein is the sourcing of refrigerant for motor cooling purposes from reservoir 74 rather than by diversion from line 72 upstream of check valve 80. In that regard, motor cooling refrigerant is supplied to motor housing 39 from reservoir 74 through line 208. The size of reservoir 74 in this embodiment is adjusted accordingly. Line 208 will preferably source refrigerant from reservoir 74 at a level higher than the level at which bearing lubricant is sourced so that should the liquid level fall, bearing lubrication will continue even if motor cooling is interrupted. The motor can be protected in such circumstances in other ways.

A further mechanical modification in the system of FIG. 4 which is applicable to others of the embodiments herein involves the use of an economizer 106 the purpose of which, as is well known with respect to refrigeration chillers, is to make use of intermediate pressure refrigerant gas existing within the system to enhance overall system efficiency. In that regard, economizer 106 is disposed within the chiller system so that condensed liquid refrigerant passes from condenser 14 through a first metering device 108 into economizer 106. Economizer 106, in the preferred embodiment, defines two discrete volumes 110 and 112. Refrigerant flowing through metering device 108 flows into volume 110 of economizer 106 and a portion of it flashes to gas at a first pressure. Such gas is then directed through line 114 to the portion of volute housing 45 (see FIG. 2) in which second stage impeller 44 is housed to increase the pressure of the gas delivered to the second stage impeller without its being acted upon by the impeller driven compression process.

A second metering device 116 is disposed between volumes 110 and 112 which meters refrigerant from volume 110 to volume 112. That process lowers refrigerant pressure in the process and causes a still further portion of the refrigerant to flash to gas at a somewhat lower pressure than the flash gas generated in volume 110.

Gas from volume 112 flows through line 118 to the portion of volute housing 45 (see FIG. 2) in which first stage impeller 42 is housed and acts to increase the pressure of the refrigerant gas in that location without its being acted upon by the first stage impeller. By the use of an economizer, additional efficiencies are added to the compression process that takes place in chiller 10 and the overall efficiency of chiller 10 is increased.

Liquid refrigerant exits volume 112 of economizer 106, flows through a third metering device 120 and enters evaporator 16. In the embodiment of FIG. 4, like the embodiment of FIG. 3, metering devices 108, 116 and 120 are fixed orifices. As is shown by the routing of line 98 to the economizer in the FIG. 4 embodiment, the present invention contemplates the possible return of refrigerant used for motor cooling and/or bearing lubrication purposes to the economizer, where one is employed, rather than to the condenser. The condenser does, however, remain a viable return location. In all other pertinent respects, the lubrication of the hybrid bearings of compressor 12 in the FIG. 4 embodiment is the same as is accomplished in the FIG. 3 embodiment, including with respect to their lubrication after chiller shutdown as shaft 48 coasts to a stop.

Referring now to FIG. 5, still another embodiment of the present invention will be described. In the embodiment of FIG. 5, refrigerant pump 62 of the embodiment of FIGS. 3 is dispensed with and condenser pressure is used to drive a controlled amount of liquid refrigerant from weir 300 of condenser 14 to the bearings 50 and 52 of compressor 12. The embodiment of FIG. 5, like the embodiment of FIG. 4, is a system in which the hybrid bearings of compressor 12 are permitted to run dry after chiller start-up until such time as sufficient liquid refrigerant has been produced and pressure developed in condenser 14 to drive liquid refrigerant from the condenser to the compressor for both bearing lubrication and motor cooling purposes.

Elimination of the pump used to pump liquid refrigerant to the compressor bearings, the cost associated with such a pump as well as elimination of the failure modes associated therewith offer distinct advantages. However, with the embodiment of FIG. 5 it must be assured that condenser pressure will at all times be sufficient during chiller operation to ensure that liquid refrigerant, in adequate quantities, is delivered to the reservoir 74 across the entire operating envelope of the chiller and is likewise sufficiently high to ensure that there is adequate liquid refrigerant at a sufficiently high pressure in reservoir 74 to cause delivery of liquid refrigerant thereoutof to the compressor bearings during the compressor coastdown period. The availability of such pressure in the condenser can be marginal under some chiller operating conditions and/or in some chiller applications so it will be appreciated that the lubrication system of FIG. 5 represents a still more risky design philosophy than the philosophy underlying the FIG. 4 embodiment. It is to be noted that because pump 62 is eliminated in the FIG. 5 embodiment, the return of refrigerant used for motor cooling purposes through line 98 is to the evaporator 16 rather than to condenser 14.

Referring now to FIG. 6, a still further alternate to the FIG. 3 preferred embodiment of the present invention will be described. In the embodiment of FIG. 6, valve 68 in line 66 from evaporator 16 is dispensed with and sump 64 is replaced by pump 400. Pump apparatus 400 is therefore in free-flow communication with both condenser 14 and evaporator 16.

Pump 400 is comprised of a housing 402 in which a motor 404, comprised of a stator 406 and rotor 408, is disposed. Stator 406 is fixedly mounted in housing 402 while rotor 408 is mounted for rotation on a drive shaft 410. Drive shaft 410, in turn, is mounted for rotation in ceramic bearings 412 and 414.

A first impeller 416 is mounted on one end of drive shaft 410 while a second impeller 418 is similarly mounted on the other end of the drive shaft. Impellers 416 and 418 are respectively disposed in impeller housings 420 and 422 and together, impeller 416 and housing 420 form a first pumping mechanism 421 while impeller 418 and housing 422 form a second pumping mechanism 423. As will be appreciated, impellers 416 and 418 are commonly driven by drive shaft 410 which, in turn, is driven by motor 404.

Impeller housing 420 defines an inlet 425 through which liquid refrigerant is drawn by pumping mechanism 421 from condenser 14 through piping 88. Impeller housing 422 similarly defines an inlet 427 through which liquid refrigerant is drawn by pumping mechanism 423 through piping 66. Piping 66, in this embodiment, is in flow communication with evaporator 16.

In operation, impeller 416 draws liquid refrigerant from condenser 14, when it is available therefrom, while impeller 418 draws liquid refrigerant from evaporator 16 when liquid refrigerant is available from that source location. Liquid refrigerant pumped by impeller 416 from condenser 14 is delivered out of impeller housing 420 into piping 424 while liquid refrigerant pumped by impeller 418 from system evaporator 16 is delivered out of impeller housing 422 into piping 426.

In the embodiment of FIG. 6, piping 424 and piping 426 converge at the location of a valve 428 which is connected to piping 72 of the preferred FIG. 3 and other alternate embodiments. Valve 428 includes a flapper element 430 which is automatically and without the need for a control or sensors positioned in accordance with the effect and pressure of the respective flow streams that enter that valve from piping 424 and piping 426. Therefore, if liquid refrigerant is available in one source location at a first pressure and in the other source location at a second pressure, valve 28 will be positioned automatically and under the effect of such pressures such that the output of the pump apparatus will be from the one of the two source locations which is at higher pressure.

As has been mentioned and as applies to all of the embodiments of the present invention, where liquid refrigerant is relied upon in a chiller for a purpose other than providing a refrigerating or cooling effect, the need is to ensure that a supply of liquid refrigerant is reliably available for such other purposes under all chiller operating conditions and circumstances. As has further been mentioned, there is essentially no location within a chiller that can reliably be assumed to contain liquid refrigerant that is capable of being pumped under all such conditions and circumstances. In general, when a chiller is shutdown or is operating at extremely low load conditions, liquid refrigerant will reliably be found to exist in the system evaporator. When the chiller is operating at load, the most reliable source of liquid refrigerant is the system condenser (liquid refrigerant in the evaporator will be boiling and thus not in a form that is readily pumped).

As has still further been mentioned, liquid refrigerant pump development to date has demonstrated that the amount of head required to permit the successful pumping of saturated liquid refrigerant is greater as the saturation temperature decreases. It is therefore more difficult to pump liquid refrigerant from the relatively more cold evaporator than from the condenser. As with the other embodiments herein, the alternate embodiment of FIG. 6 uses liquid refrigerant sourced from the condenser for bearing lubrication and compressor drive motor cooling purposes under the majority of chiller operating conditions and uses liquid refrigerant sourced from the evaporator for such purposes when liquid refrigerant is not reliably available from the system condenser (such as at chiller start-up) or is not in a state within the condenser that facilitates pumping. It can be expected, however, that under any chiller operating condition or circumstance, liquid refrigerant that is capable of being pumped will be available from one and sometimes both of these source locations.

With respect to the FIG. 6 embodiment, when pump apparatus 400 is in operation, both of impellers 416 and 418 rotate and simultaneously attempt to draw liquid refrigerant, if available, from their respective source locations. Because of the pressure, amount and condition of the refrigerant in their respective source locations, the refrigerant, if any, respectively discharged into piping 424 by pumping mechanism 421 and into piping 426 by pumping mechanism 423 will, at any given moment, most often be at different pressures in accordance with the then-existing conditions in those respective source locations.

Valve 428 is essentially a simple check valve arrangement that channels the flow of liquid refrigerant into piping 72 from the one of the two pumping mechanisms that constitute pump apparatus 400 the output of which is at higher pressure. That pumping mechanism will be the one which draws refrigerant from the source location where liquid refrigerant exists and is at higher pressure at the moment. As internal chiller conditions change and the other source location comes to contain liquid refrigerant at higher pressure, the position of flapper element 430 will change and the source of liquid refrigerant will shift in accordance with such changed conditions. It will be noted that the assured supply of liquid refrigerant to piping 72 in the embodiment of FIG. 6 is accomplished very simply, in accordance with the laws of physics, and without the need for sensors or proactive control of any device to select the appropriate source location.

Rather than using flapper type check valve 428, a first check valve 440, shown in phantom in FIG. 6, could be disposed in line 424 and a similar second check valve 442, likewise shown in phantom in FIG. 6, could be disposed in piping 426. Like the aforementioned arrangement in which valve 428 is employed, the purpose of individual check valves 440 and 442 is to permit the flow of liquid refrigerant out of the one of piping 424 and piping 426 which is the source of higher pressure liquid refrigerant while blocking the flow of such higher pressure liquid refrigerant into the other of pipes 424 and 426 and to the impeller which feeds it.

It is to be noted that although the embodiment of FIG. 6 employs two impellers, the costs associated with the use of a second impeller are minimal. With respect to the lubrication of ceramic bearings 412 and 414 and the cooling of pump motor 404, bearing 412, which is adjacent pumping mechanism 421 that draws liquid refrigerant from condenser 14 (a typically higher pressure location), will preferably be a shielded bearing that permits the metered leakage of liquid refrigerant out of impeller housing 420 leakage through it and into the interior 432 of motor housing 402. Bearing 414, adjacent pumping mechanism 423, may or may not be shielded.

During normal chiller operation, a metered amount of liquid refrigerant will pass through shielded bearing 412 from the relatively high pressure condenser location, will enter the interior 432 of the motor housing. In the process, it will both lubricate bearings 412 and 414 and cool motor 404. Under the more infrequent circumstance where evaporator 16 is the higher pressure source for liquid refrigerant, such refrigerant will flow through bearing 414 into the interior of 432 and will both lubricate the pump bearings and cool the motor. The interior of housing 402 in the embodiment of FIG. 6 is vented through line 434 to evaporator 16 although the best vent location has not, as of this writing, been determined. Bearing 412 must be shielded and refrigerant flow therethrough metered or that location would constitute a high-to-low side leak within the chiller which would be detrimental to chiller operation and efficiency. That same concern does not exist when "atypical" systems conditions cause the evaporator to be the source of higher pressure liquid refrigerant.

It is also to be noted that the pump impeller that is not active at any one time to pump liquid refrigerant into line 72 against the pumping action of the other impeller may experience refrigerant churning in its attempts to pump a mixture of gas and liquid refrigerant from its source location. Such churning should not be problematic since any heat generated thereby will cause the churned liquid portion of the refrigerant to flash to gas which, in turn, will provide cooling in the location of that impeller.

It is still further to be noted that the present invention also contemplates the use of pump apparatus that is constituted of two discrete motor/pump combinations, appropriately piped together. The use of two motors to drive two pump mechanisms is, of course, less attractive for many reasons than the use of a single motor to drive two pump mechanisms.

Finally, and as will be apparent, the pumping arrangement of FIG. 6, while specifically designed in contemplation of a chiller system using ceramic bearings in which liquid refrigerant is used to lubricate such bearings, is applicable for motor cooling purposes in conventional chiller's where oil is used for compressor bearing lubrication.

Referring back now to FIG. 2, as applicants have noted, drive motor 40 is, in the preferred embodiment, an induction motor driven by a variable speed drive. Heretofore, typical induction motors, which bring with them advantages of low cost and reliability, have generally not been driven by variable speed drives in chiller applications at speeds greater than 3600 RPM.

In chillers of the gear drive design, while the induction motor which drives the gear train is typically driven to a maximum speed on the order of 3600 RPM, the impeller of the machine and the shaft on which the impeller is mounted are driven at relatively very much higher speed by the speed increasing effect of the gear train. Such machines, which are most typically single stage machines, are run over a range of speeds in order to modulate the capacity of the chiller over a design capacity range. Relatively very high speeds (on the order of 15,000 RPM) are often required of such single stage machines in order for such chillers to deliver their maximum capacity and, once again, such machines have the disadvantage of requiring the existence of an oil-based lubrication system.

Applicant's have prospectively determined that proven, less expensive induction motors can be structurally strengthened with respect to their construction, so as to permit such motors to be driven at speeds which are higher than the 3,600 RPM they are typically driven at in current direct and gear drive chillers but which are relatively far lower than the speeds required of high speed gear drive machines to deliver the same and maximum capacity. In that regard, applicant's have found that where the compressor's drive motor is a structurally strengthened induction motor that is reduced in size but driven at speeds higher than 3600 RPM and where the chiller is a multiple stage direct drive chiller, a capacity modulated chiller is capable of being produced which can deliver a capacity equal to that of a gear drive machine under a circumstance in which the impellers are driven at a speed which is only on the order of one-half of the speeds required of single stage gear drive chillers in delivering such capacity. Such a direct drive chiller is capable of delivering its capacity by the use of an induction motor driven by conventional variable speed drive technology and without resort to exotic or expensive emerging motor and/or motor drive technology, and, by the use of hybrid bearings, offers the still further advantages of a chiller in which the need for an oil-based lubrication system is eliminated entirely.

One other aspect of the present invention related to the use of a variable speed compressor drive motor in association with the oil-free liquid chiller disclosed herein is the opportunity to cool variable speed drive 54 with liquid refrigerant as opposed to air which is the more typical case. As is illustrated in FIG. 6, line 500, shown in phantom, branches off of line 90 through which liquid refrigerant is delivered into heat exchange contact with chiller drive motor 40. The liquid refrigerant flowing into drive 54 cools the heat generating components therein and will preferably be returned to condenser 14 through line 502. Line 500, through which liquid refrigerant is sourced for purposes of cooling drive 54 could alternatively branch directly off of line 72 or could be fed out of reservoir 74. Alternatively, liquid refrigerant could sequentially be caused to flow in a series rather than parallel fashion to the compressor drive motor and controller 54. It will be appreciated that this concept is not limited in application to the embodiment of FIG. 6 but could likewise be applied to the other embodiments described herein.

It will be appreciated that while the present invention has been described in terms of a preferred and alternate embodiments, other modifications and features pertaining thereto fall within the scope of the invention. As such, the present invention is not limited to such embodiments but encompasses such still other embodiments and modifications that will be apparent to those skilled in the art given the teaching hereof.

What is claimed is:

1. A liquid chiller comprising:
    a condenser, said condenser condensing refrigerant gas to the liquid state when said chiller is in operation;

a metering device, said metering device receiving refrigerant from said condenser and reducing the pressure thereof;

an evaporator, said evaporator receiving refrigerant from said metering device and causing liquid refrigerant to vaporize when said chiller is in operation;

a compressor, said compressor receiving refrigerant from said evaporator and delivering refrigerant in the gaseous state to said condenser when said chiller is in operation, said compressor having a shaft, at least one compressive element being mounted on said shaft, said shaft being rotatably supported by at least one bearing, said at least one bearing being a rolling element bearing, the rolling elements of said bearing being fabricated from a non-metallic material, said at least one bearing being lubricated by refrigerant in the absence of oil, refrigerant delivered to said at least one bearing for lubrication purposes being at least primarily in the liquid state, heat from said at least one bearing being rejected to and vaporizing a portion of the refrigerant delivered thereto at the location of said at least one bearing as a result of the bearing lubrication process; and a source location for liquid refrigerant, discrete from said evaporator and condenser, from which liquid refrigerant is supplied to said at least one bearing for bearing lubrication purposes.

2. The chiller according to claim 1 wherein said chiller is a centrifugal chiller, wherein said non-metallic bearing material is a ceramic material, wherein said compressive element is an impeller and wherein the refrigerant used to lubricate said at least one bearing is primarily in the liquid state.

3. The chiller according to claim 2 wherein said source location is a reservoir for refrigerant.

4. The chiller according to claim 2 further comprising a refrigerant sump, liquid refrigerant being delivered to said sump from said evaporator while said chiller is shutdown.

5. The chiller according to claim 4 wherein said source location is a reservoir for refrigerant, said reservoir being in selective flow communication with said sump, said sump being the location from which liquid refrigerant is initially provided to said reservoir for bearing lubrication purposes when said chiller starts up.

6. The chiller according to claim 5 wherein said sump is isolated from said evaporator when said chiller starts up.

7. The chiller according to claim 6 further comprising means for delivering liquid refrigerant to said reservoir so as to replenish the supply of liquid refrigerant available for bearing lubrication purposes therein while said chiller is in operation.

8. The chiller according to claim 7 wherein said means for delivering liquid refrigerant initially delivers liquid refrigerant from said sump to said reservoir as said chiller starts up and subsequently delivers liquid refrigerant from said condenser to said reservoir.

9. The chiller according to claim 8 wherein said means for delivering liquid refrigerant is a pump, said pump being in flow communication with and disposed (i) upstream of said reservoir and (ii) downstream of both said condenser and said sump.

10. The chiller according to claim 5 further comprising means for isolating said reservoir upon shutdown of said chiller so as to retain a residual pressure therein for a period of time after chiller shutdown, said residual pressure being the driving force by which liquid refrigerant in said reservoir at the time of chiller shutdown is driven to said at least one bearing so as to provide for the lubrication thereof while said shaft coasts to a stop.

11. The chiller according to claim 5 wherein said chiller further comprises a motor and a pump, said pump pumping liquid refrigerant from said sump to both said reservoir and said motor when said chiller starts up and from said condenser to both said reservoir and said motor when said chiller is in operation, liquid refrigerant pumped to said reservoir by said pump being used to lubricate said at least one bearing and liquid refrigerant pumped to said motor by said pump being used to cool said motor.

12. The chiller according to claim 2 further comprising a motor for driving said compressor and means for delivering liquid refrigerant to both said source location for bearing lubrication purposes and to said motor for motor cooling purposes while said chiller is in operation.

13. The chiller according to claim 12 further comprising a variable speed drive, said motor being an induction motor capable of being driven at variable speeds substantially higher than 3600 RPM in order for said chiller to operate at its maximum capacity.

14. The chiller according to claim 12 further comprising a pump, said pump pumping liquid refrigerant to said source location and to said motor both during start-up and during normal operation of said chiller.

15. The chiller according to claim 12 further comprising a reservoir, a pump and a sump, said reservoir being said source location for liquid refrigerant for bearing lubrication purposes, said pump pumping liquid refrigerant from said sump to both said reservoir and said motor when said chiller initially starts up and said pump pumping liquid refrigerant from said condenser to both said reservoir and said motor subsequent to start-up of said chiller when liquid refrigerant comes to be available in said condenser for such purposes.

16. The chiller according to claim 12 further comprising an economizer, refrigerant used for cooling said motor and the refrigerant used for lubricating said at least one bearing being delivered to said economizer subsequent to such uses.

17. The chiller according to claim 12 further comprising a drive for said motor and means for delivering liquid refrigerant to said motor drive for purposes of cooling heat generating components therein.

18. The chiller according to claim 17 wherein refrigerant used for bearing lubrication purposes, for motor cooling purposes and for motor drive cooling purposes is returned to said condenser.

19. The chiller according to claim 17 further comprising an economizer, refrigerant used for cooling said motor and said motor drive being returned to said economizer.

20. The chiller according to claim 2 further comprising means for delivering liquid refrigerant sourced from one of said evaporator and said condenser to said source location while said chiller is in operation.

21. The chiller according to claim 20 wherein said means for delivering refrigerant from one of said condenser and said evaporator comprises a pump.

22. The chiller according to claim 21 wherein said source location is a reservoir for liquid refrigerant, liquid refrigerant in said reservoir being the refrigerant by which said at least one bearing is lubricated.

23. The chiller according to claim 22 further comprising a sump, said sump being the location from which said reservoir is replenished with liquid refrigerant during chiller start-up, said pump pumping liquid refrigerant from said sump to said reservoir during chiller start-up and from said condenser to said reservoir when said chiller is in operation.

24. The chiller according to claim 22 wherein refrigerant used for bearing lubrication purposes is returned to said condenser subsequent to such use.

25. The chiller according to claim 22 wherein the rate of flow of liquid refrigerant from said reservoir to said at least one bearing is such that at least 80% of the liquid refrigerant delivered to said at least one bearing for bearing lubrication purposes remains in the liquid state subsequent to having been used to lubricate said at least one bearing.

26. The chiller according to claim 22 wherein said pump has an impeller, a motor and a shaft, said pump shaft being mounted for rotation in a pump bearing, said pump bearing having rolling elements fabricated from a ceramic material, said pump motor being cooled and said pump bearing being lubricated by liquid refrigerant, said pump impeller pumping liquid refrigerant from said sump to said reservoir as said chiller starts up and from said condenser to said reservoir when said chiller is in operation.

27. A liquid chiller comprising:
   a condenser, said condenser condensing refrigerant gas to the liquid state when said chiller is in operation;
   a metering device, said metering device receiving refrigerant from said condenser;
   an evaporator, said evaporator receiving refrigerant from said metering device;
   a compressor, said compressor receiving refrigerant from said evaporator and delivering refrigerant in the gaseous state to said condenser when said chiller is in operation;
   a motor, said motor driving said compressor and being cooled by refrigerant sourced from said condenser;
   a variable speed drive, said variable speed drive being electrically connected to said compressor drive motor for varying the speeds thereof, refrigerant being delivered from said condenser to said variable speed drive so as to cool said variable speed drive.

28. The chiller according to claim 27 further comprising a pump, said pump pumping refrigerant from said condenser to said variable speed drive so as to cool said variable speed drive.

29. The chiller according to claim 28 wherein refrigerant delivered by said pump to said variable speed drive is returned therefrom to said condenser.

30. The chiller according to claim 29 wherein refrigerant pumped from said condenser by said pump is pumped in parallel to both said compressor drive motor and to said variable speed drive.

31. The chiller according to claim 29 wherein refrigerant pumped by said pump from said condenser is pumped in series to both said compressor drive motor and to said variable speed drive.

32. The chiller according to claim 29 wherein said compressor includes at least one bearing, said at least one bearing being a rolling element bearing, the rolling elements of said bearing being fabricated from a non-metallic material, said at least one bearing being lubricated by refrigerant in the absence of oil, refrigerant delivered to said at least one bearing for lubrication purposes being at least primarily in the liquid state and a portion of the refrigerant used in the lubrication of said at least one bearing vaporizing at the location of said at least one bearing as a result of the bearing lubrication process, said pump pumping refrigerant from said condenser to said at least one bearing for bearing lubrication purposes.

33. The chiller according to claim 32 further comprising a reservoir, refrigerant pumped by said pump from said at least one bearing being pumped to said reservoir prior to flowing to said at least one bearing.

34. The chiller according to claim 33 wherein refrigerant pumped by said pump from said condenser is additionally pumped to said compressor drive motor, the refrigerant pumped to said variable speed drive being pumped to said reservoir prior to flowing to said variable speed drive.

35. The chiller according to claim 34 wherein refrigerant to said at least one bearing for bearing lubrication purposes drains, subsequent to being used for lubrication purposes to a location in said compressor drive motor and is returned therefrom, together with refrigerant used for motor cooling purposes, to said condenser.

36. The chiller according to claim 29 wherein said pump pumps refrigerant to said compressor drive motor so as to cool said motor and further comprising apparatus for regulating the flow of refrigerant pumped by said pump to said compressor drive motor and to said variable speed drive in accordance with the conditions under which said chiller is operating.

37. The chiller according to claim 29 wherein said motor is an induction motor, wherein, in addition to pumping refrigerant to said variable speed drive, said pump pumps refrigerant to said compressor drive motor so as to cool said motor, said pump increasing the pressure of refrigerant pumped by it from said condenser to a pressure which is higher than condenser pressure, and wherein heat rejected to refrigerant pumped by said pump to said compressor drive motor and to said variable speed drive is carried therein back to said condenser, said condenser transferring such heat, which has a parasitic effect on the efficiency of said chiller, to the cooling medium which flows through said condenser.

38. The liquid chiller according to claim 27 further comprising a pump, wherein refrigerant is pumped by said pump from said condenser to both said compressor drive motor and to said variable speed drive so as to cool said compressor drive motor and said variable speed drive, said pump increasing the pressure of refrigerant pumped by it from said condenser to a pressure which is higher than condenser pressure, and wherein heat rejected to refrigerant pumped by said pump to said compressor drive motor and said variable speed drive is carried therein back to said condenser, said condenser transferring such heat, which has a parasitic effect on the efficiency of said chiller, to the cooling medium which flows through said condenser.

39. The liquid chiller according to claim 38 wherein said compressor includes at least one bearing, said bearing being lubricated by refrigerant in the absence of oil, the refrigerant used to lubricate said at least one bearing in the absence of oil being refrigerant pumped thereto from said condenser by said pump.

40. The liquid chiller according to claim 39 wherein said pump pumps liquid refrigerant from said condenser, in parallel, to said at least one bearing and to said compressor drive motor, the liquid refrigerant pumped to said variable speed drive by said pump being pumped thereto in parallel with refrigerant pumped by said pump to said compressor drive motor.

41. A method of operating the liquid chiller comprising the steps of:
   connecting a condenser, a metering device, an evaporator and a compressor for flow so as to form a refrigeration circuit;
   flowing a cooling medium through said condenser so as to carry heat thereoutof;
   driving said compressor by the use of a motor;
   controlling the speed of said motor by the use of a variable speed drive which includes heat generating components;
   delivering refrigerant from said condenser to said at least one of said compressor drive motor and said variable speed drive;

rejecting heat from said at least one of said compressor drive motor and said variable speed drive to the refrigerant delivered in said delivering step;

returning refrigerant to which heat has been rejected in said rejecting step to said condenser; and transferring heat carried back to said condenser in said returning step to the cooling medium which flows through said condenser.

42. The method according to claim 41 wherein said delivering step includes the step of pumping refrigerant from said condenser to said at least one of said motor and said variable speed drive.

43. The chiller according to claim 42 wherein said pumping step includes the step of pumping refrigerant in parallel from said condenser to both of said motor and said variable speed drive.

44. The method according to claim 42 wherein said pumping step includes the step of pumping refrigerant in series from said condenser to both of said compressor drive motor and variable speed drive.

45. The method according to claim 42 wherein said compressor includes a bearing and wherein said pumping step includes the step of pumping refrigerant from said condenser to said bearing so as to lubricate said bearing.

46. The method according to claim 45 wherein said chiller includes a reservoir and wherein said pumping step includes the step of delivering refrigerant to said reservoir prior to its delivery to said bearing for bearing lubrication purposes.

47. The method according to claim 46 comprising the further step of isolating refrigerant in said reservoir from a drop in pressure upstream thereof so that pressurized refrigerant continues to be available from said reservoir to lubricate said bearing for a predetermined period of time in the event of a pressure drop upstream of said reservoir.

48. The method according to claim 47 comprising the further step of delivering refrigerant from said reservoir to said variable speed drive so as to cool said variable speed drive.

49. The method according to claim 45 comprising the further step of defining a flow path from said bearing to said motor so that refrigerant used to lubricate said bearing flows to said motor and returns to said condenser, in said returning step, with refrigerant used to cool said drive motor.

50. The method according to claim 42 comprising the further step of regulating the flow of refrigerant pumped in said pumping step in accordance with chiller operating conditions.

51. The method according to claim 41 wherein said driving step includes the step of driving said compressor directly so that said compressor is driven at the same rotational speed as the rotor of said drive motor.

* * * * *

UNITED STATES PATENT AND TRADEMARK OFFICE
CERTIFICATE OF CORRECTION

PATENT NO. : 6,564,560 B2
DATED : May 20, 2003
INVENTOR(S) : Arthur L. Butterworth et al.

It is certified that error appears in the above-identified patent and that said Letters Patent is hereby corrected as shown below:

Column 24,
Line 4, after the word "refrigerant" insert -- delivered --.

Signed and Sealed this

Second Day of September, 2003

JAMES E. ROGAN
*Director of the United States Patent and Trademark Office*